United States Patent [19]

Kitamura et al.

[11] 4,272,424

[45] Jun. 9, 1981

[54] PROCESS FOR THE PREPARATION OF VINYL CHLORIDE-BASED RESINS

[75] Inventors: Hajime Kitamura; Kazuhiko Kurimoto; Koji Azuma, all of Ibaragi, Japan

[73] Assignee: Shin-Etsu Chemical Co., Ltd., Tokyo, Japan

[21] Appl. No.: 84,380

[22] Filed: Oct. 12, 1979

[30] Foreign Application Priority Data

Oct. 20, 1978 [JP] Japan .................................. 53-129278

[51] Int. Cl.$^3$ ...................... C08L 33/10; C08L 27/06; C08K 3/00; C08L 9/08
[52] U.S. Cl. .................. 260/29.6 RW; 260/29.7 UA; 260/29.7 W; 260/42.43; 260/42.49; 525/197; 525/227; 525/228; 525/239
[58] Field of Search .............. 260/29.6 RB, 29.6 RW, 260/29.7 UA, 29.7 W

[56] References Cited

U.S. PATENT DOCUMENTS

| | | | |
|---|---|---|---|
| 3,424,706 | 1/1969 | Smith ........................... | 260/29.6 RB |
| 3,725,367 | 4/1973 | Kemp ............................... | 526/201 X |
| 4,090,994 | 5/1978 | Nagano ........................... | 260/31.8 R |

FOREIGN PATENT DOCUMENTS 627265 8/1949 United Kingdom ............. 260/29.6 RB

*Primary Examiner*—C. A. Henderson
*Attorney, Agent, or Firm*—Toren, McGeady and Stanger

[57] ABSTRACT

A novel process is proposed for the preparation of vinyl chloride based resins modified with a polymer latex, according to which the latex polymer is absorbed so completely and uniformly on the polyvinyl chloride resin that the effect of the modification of the resin properties is remarkably enhanced along with no adverse effects on the particle size distribution of the resin product and no effluence of the latex into the waste water discharged in the dehydration of the aqueous polymerizate slurry after completion of the polymerization. The process of the invention comprises introducing the modifier polymer latex into the polymerization mixture only when the monomer conversion is in the range from 30 to 95% and introducing an inorganic fine powder such as fume silica, bentonite and diatomaceous earth into the polymerization mixture at the same time as or before the introduction of the modifier polymer latex.

4 Claims, No Drawings

PROCESS FOR THE PREPARATION OF VINYL CHLORIDE-BASED RESINS

BACKGROUND OF THE INVENTION

The present invention relates to a novel process for the preparation of vinyl chloride-based resins or, more particularly, to a process for the preparation of vinyl chloride-based resins modified with a polymer latex by the suspension polymerization of vinyl chloride monomer or a monomer mixture mainly composed of vinyl chloride in an aqueous medium.

As is well know, polyvinyl chloride resins are prepared mostly by the suspension polymerization of the monomer or monomers in an aqueous medium in the presence of a suspending agent and a polymerization initiator soluble in the monomer phase. The polyvinyl chloride resins thus obtained are fabricated into various kinds of shaped articles to be used in a wide variety of applications. It is a usual practice that, when improvement in some properties of the resin powder per se or the shaped articles thereof is desired, the resin powder is admixed, prior to fabrication, uniformly with various kinds of additives according to the object including impact strength improvers, heat stabilizers, workability improvers and the like.

For example, impact strength in the shaped articles of vinyl chloride-based resins can be improved by blending the resin with various kinds of polymers such as copolymeric resins of acrylonitrile, butadiene and styrene (ABS resins), copolymeric resins of methyl methacrylate, butadiene and styrene (MBS resins), copolymeric resins of ethylene and vinyl acetate (EVA resins) and the like and the workability of the resin powder can be improved with methacrylic ester-based resins and styrene-based resins.

It is of course desirable that, in order that improvement of the objective property of the resin powder or the shaped articles thereof can be achieved as far as possible by the admixture of the above mentioned modifier resins, the admixing of the vinyl chloride-based resin and the modifier polymer is as intimate as possible microscopically so that the modifier polymer should be in a form of very finely divided powder.

Whereas the finely divided powder of the above mentioned modifier polymers for the improvement of impact strength of the shaped articles or the workability of the polyvinyl chloride resin is usually obtained by drying and pulverizing the latex of the respective polymers prepared by the emulsion polymerization of the monomers in an aqueous medium, handling of such powders is not always performed with ease and convenience and uniform blending of them with the polyvinyl chloride resin is carried out only with considerable difficulty. Consequently, the improvement of the desired properties is also sometimes far from satisfaction by the dry blending described above.

Accordingly, an improved method for the admixture of the modifier polymer with the polyvinyl chloride resin has been proposed in which the modifier polymer is admixed as an emulsion or latex thereof into the aqueous polymerizate slurry of the polyvinyl chloride resin after completion of the polymerization reaction whereby the particles of the modifier polymer are absorbed or adsorbed on the resin particles of the polyvinyl chloride resin and the aqueous slurry of the polyvinyl chloride polymerizate having the modifier polymer particles adsorbed thereon is dehydrated and dried to give the finished product. This method is, however, defective in two aspects. Firstly, the adsorption of the particles of the latex polymer does not always take place completely so that uniformity in the blending of the modifier polymer with the polyvinyl chloride resin cannot be satisfactory at least microscopically. Secondly, the waste water discharged from the dehydration procedure contains considerable amount of the latex polymer suspended therein to render the water turbid so that the discharging of the waste water into the environmental hydrosphere causes a serious problem of pollution which can be solved only with great economical disadvantages.

To eliminate the above disadvantages in the process of the addition of the modifier polymer latex into the aqueous polymerizate slurry of the polyvinyl chloride resin after completion of the polymerization reaction, a further improved method has been proposed in which the latex of the modifier polymer is added into the aqueous polymerization medium for the suspension polymerization of vinyl chloride and the polymerization is carried out in the presence of the latex of the modifier polymer. This method is also not free from several disadvantages that the addition of the latex adversely affects the condition of dispersion of the monomer droplets in the aqueous medium leading to the formation of coarser particles of the polyvinyl chloride resin and the polymer scale deposition on the walls of the polymerization reactor is markedly increased.

Furthermore, the adsorption of the latex particles on the polyvinyl chloride resin particles is also not complete even in this method so that the problem of the environmental pollution of the hydrosphere by the waste water discharged in the dehydration of the polymerizate slurry cannot be solved to a satisfactory extent along with the increased cost due to the loss of considerable amount of the modifier polymer in the waste water.

SUMMARY OF THE INVENTION

Thus an object of the present invention is to provide a novel and improved method for the preparation of vinyl chloride-based resins modified with polymer latices free from the above described problems in the prior art method, according to which advantages are obtained in that no coarser particles of the polyvinyl chloride resin are formed in the polymerization and that the adsorption of the particles of the latex polymer on the polyvinyl chloride resin particles is so complete that the admixture of the modifier polymer with the polyvinyl chloride resin is very uniform and intimate microscopically and the waste water from the dehydration of the aqueous polymerizate slurry is clear and free from contamination with the latex and causes no problem of the environmental pollution.

The method of the present invention comprises, in a process for the preparation of vinyl chloride-based resins modified with a polymer latex by the suspension polymerization of vinyl chloride monomer or a monomer mixture mainly composed of vinyl chloride in an aqueous medium containing a water-soluble suspending agent and a polymerization initiator soluble in the monomer phase, introducing a latex of the modifier polymer into the polymerization mixture when the conversion of the monomer or monomers is in the range from 30 to 95%, introducing an inorganic fine powder into the polymerization mixture at the same time as or before the introduction of the latex of the modifier polymer and continuing the polymerization reaction to completion where the monomer conversion is larger by at least 2% than at the moment of the introduction of the latex of the modifier polymer.

DETAILED DESCRIPTION OF THE PREFERRED EMBODIMENTS

The process of the present invention is basically not different from conventional process for the preparation of vinyl chloride-based resins by the suspension polymerization of vinyl chloride monomer or a monomer mixture mainly composed, say, 50% by weight or more, of vinyl chloride with one or more copolymerizable comonomers in an aqueous medium containing a water-soluble suspending agent and a polymerization initiator soluble in the monomer phase except for the addition of a latex of a modifier polymer and an inorganic fine powder.

The inventive method is applicable not only to the homopolymerization but also to the copolymerization with any comonomer or comonomers in so far as the main component of the monomer mixture is vinyl chloride. The comonomers suitable for the copolymerization with vinyl chloride are exemplified by acrylic and methacrylic acids and esters thereof, maleic anhydride, acrylonitrile, vinyl ethers, vinyl esters such as vinyl acetate, vinyl fluoride, aromatic vinyl compounds such as styrene, vinyliden halides such as vinylidene chloride and the like.

The water-soluble suspending agent added in the aqueous polymerization medium is a water-soluble polymeric substance such as partially saponified polyvinyl acetates, water-soluble cellulose ethers, copolymers of vinyl acetate and maleic anhydride, polyvinyl pyrrolidones, copolymers of styrene and maleic anhydride and the like and used usually in an amount from 0.05 to 0.5% by weight based on the monomer or monomers.

The polymerization initiator should be soluble in the monomer phase and insoluble in the aqueous medium. Such a polymerization initiator is exemplified by organic peroxides such as lauroyl peroxide, benzoyl peroxide, tert-butylperoxy pivalate, acetylcyclohexylsulfornyl peroxide and the like and organic azo compounds such as $\alpha, \alpha'$-azobisisobutyronitrile, $\alpha, \alpha'$-zaobis-2,4-dimethylvaleronitrile, $\alpha, \alpha'$-azobis-4-methoxy-2,4,-dimethylvaleronitrile, diisopropylperoxy dicarbonate, di-2-ethylhexylperoxy dicarbonate and the like.

The above mentioned water-soluble suspending agents and the polymerization initiators may, of course, be used either singly or as a combination of two or more. The conditions of the polymerization, e.g. the amount of water, polymerization temperature, pressure in the polymerization reactor, duration of the polymerization reaction, etc., are rather conventional with no particular limitations.

According to various requirements, for example, of prevention of polymer scale deposition on the reactor walls, control of the polymerization velocity, regulation of the particle size distribution of the resultant resin and the average degree of polymerization, the polymerization mixture may contain certain additives such as a pH adjusting agent, e.g. sodium phosphate and sodium hydroxide, a hydrocarbon solvent, e.g. hexane and pentane, a halogenated hydrocarbon or a mercaptan compound as a chain transfer agent, e.g. trichloroethylene, perchloroethylene, 2-mercaptoethyl alcohol and laurylmercaptan in a usual manner and usual amounts.

The modifier polymer to be added to the polymerization mixture in a form of latex is not limited to a particular kind according to the objective property of the polyvinyl chloride resin to be improved by the modifier polymer. Several of the examples of the monomers to be emulsion-polymerized into the modifier polymer latex suitable for the inventive process are acrylic acid esters such as methyl acrylate, ethyl acrylate and 2-ethylhexyl acrylate, methacrylic acid esters such as methyl methacrylate and butyl methacrylate, vinyl chloride, aromatic vinyl compounds such as styrene and $\alpha$-methylstyrene, monolefins such as ethylene and propylen, diene compounds such as butadiene and isoprene, vinylidene halides such as vinylidene chloride, vinyl esters such as vinyl acetate and vinyl propionate, acrylonitrile, methacrylonitrile and the like. The method for the emulsion polymerization of one or a combination of these monomers in an aqueous medium is well known in the art and the resultant polymer latex usually contains from 10 to 50% by weight of the solid polymer particles having a diameter in the range from about 0.05 to about 0.5 $\mu$m.

As is mentioned above, the selection of the modifier polymer latex depends on the properties of the vinyl chloride-based resins to be improved by the admixture of the modifier polymer. For example, workability of the resin can be improved by the addition of a copolymer latex of methyl methacrylate and 2-ethylhexyl acrylate and the impact strength of the shaped articles of the resin can be improved by the addition of a copolymer latex of butadiene and styrene, copolymer latex of ethylene and vinyl acetate or a copolymer latex mainly composed of methyl acrylate and/or butyl acrylate.

The inorganic fine powder to be introduced into the polymerization mixture at the same time as or before the introduction of the above modifier polymer latex is exemplified by finely divided silicon dioxide, calcium carbonate, magnesium carbonate, bentonite, kaolin, sericite, aluminum oxide, titanium dioxide, clay, talc, calcium phosphate, calcium sulfate, diatomaceous earth, barium sulfate and the like. These inorganic fine powders have desirably an average particle diameter smaller than 50 $\mu$m or, more preferably, smaller than 10 $\mu$m.

The introduction of the above mentioned modifier polymer latex into the polymerization mixture must be effected only when the conversion of the vinyl chloride monomer or the monomer mixture into polymer is in the range from 30 to 95% or, preferably, from 60 to 85%. When the introduction of the modifier polymer latex is effected at a too early stage where the monomer conversion is smaller than 30%, the resultant polyvinyl chloride polymerizate will contain large amounts of coarser particles with undesirable particle size distribution whereas the introduction at a too late stage where the monomer conversion exceeds 95% will result in an incomplete adsorption of the latex polymer particles on the polyvinyl chloride resin particles so that the turbidity of the waste water discharged from the dehydration step of the polymerizate slurry markedly increases as containing large amounts of the latex polymer particles. The amount of the modifier polymer latex to be added into the polymerization mixture depends, of course, on various factors but it is usually in the range from 0.1 to 50% or, more effectively, from 1 to 50% by weight as solid based on the amount of the monomer or monomers initially introduced into the polymerization reactor. This is because that smaller amounts than 0.1% by weight naturally cannot give the desired effect of modification of the resin properties while larger amounts than 50% by weight will destroy the excellent properties inherent to the vinyl chloride-based resins and also increase the amount of the effluent latex in the waste water due to the increased relative incompleteness of adsorption of the latex polymer particles on the vinyl chloride-based resin.

The introduction of the inorganic fine powder into the polymerization mixture must be effected at the same time as or prior to the introduction of the modifier polymer latex. When the introduction of the inorganic fine powder is preceeded by the introduction of the modifier polymer latex, the beneficial effects of the inventive method can be obtained only incompletely. It should also be noted that too early introduction of the inorganic fine powder, for instance, before the start of the polymerization reaction, into the polymerization mixture may have some adverse effects on the size and uniformity of the resin particles so that it is recommended to introduce the inorganic fine powder into the polymerization mixture after the monomer conversion has reached 10% or more.

The amount of the inorganic fine powder to be added into the polymerization mixture depends upon the amount and sort of the modifier polymer latex and should be determined in the individual cases but an amount of from 0.05 to 50% by weight or, preferably, from 0.3 to 30% by weight of the inorganic fine powder is satisfactory in most cases based on the amount of the monomer or monomers initially introduced into the polymerization reactor.

It is also necessary that, in addition to the timely introduction of the inorganic fine powder and the modifier polymer latex into the mixture under polymerization reaction, the polymerization reaction is further continued to completion where the monomer conversion is larger by at least 2% or, preferably, at least 5% than at the moment of the introduction of the modifier polymer latex. In other words, if the polymerization reaction is terminated shortly after the introduction of the modifier polymer latex into the polymerization mixture, the object of the present invention can be accomplished to a reduced extent.

As is understood from the above description, the timely introduction of the inorganic fine powder into the polymerization mixture is effective in increasing the adsorption of the particles of the modifier polymer on to the particles of the vinyl chloride-based resin without formation of coarser particles in the polymerizate and, consequently, the waste water discharged in the dehydration step of the polymerizate slurry is as clear as in the use of no modifier polymer latex in the polymerization.

Following are the examples to illustrate the inventive process in further detail together with several comparative examples.

EXAMPLE 1

Into a stainless steel polymerization reactor of 20 liter capacity were introduced 8 kg of water, 4 kg of vinyl chloride monomer, 4 g of hydroxypropylmethylcellulose and 1 g of disopropylperoxy dicarbonate to form a polymerization mixture which was heated up to a temperature of 57° C. with agitation to effect polymerization of the vinyl chloride monomer. In the course of the polymerization reaction, an inorganic fine powder and a latex of a modifier polymer were added into the polymerization mixture. The kinds and amounts of the inorganic fine powder and the polymer latex as well as the times at which these additives were introduced into the polymerization mixture were as set out in Table 1 below. The time in hours given in the table is the duration from the beginning of heating of the polymerization mixture to the introduction of the powder or latex. In Experiment No. 1 in the table, cokes were formed and, in Experiment No. 6, the latex was added to the polymerization mixture from which the unreacted monomer had been removed after completion of the reaction.

The polymerization reaction thus carried out was terminated when the pressure inside the polymerization reactor had dropped to 5 kg/cm$^2$G corresponding to a monomer conversion of about 91% by cooling the polymerization reactor to room temperature except for Experiment No. 5 in which the reaction was terminated after 10 hours from the beginning of heating of the polymerization mixture. The aqueous polymerizate slurry thus obtained was dehydrated by centrifugal separation and the dehydrated resin was subjected to drying to give a finished product. The turbidity of the waste water discharged from the centrifugal separator and the particle size distribution of the finished polyvinyl chloride resin were examined to give the results shown in the table.

In the table, the meanings of the notations for the kinds of the inorganic fine powders and the modifier polymer latices, the turbidity of the waste water and the condition of the particle size distribution are as follows.

Inorganic fine powder

S-1: a fume silica having an average particle diameter of about 12 nm (Aerosil 200, a product of DEGUSSA, West Germany)

S-2: bentonite having an average particle diameter of about 0.03 μm

S-3: calcium phosphate having an average particle diameter of about 0.8 μm

S-4: diatomaceous earth having an average particle diameter of about 5 μm

Modifier polymer latex

E-1: a copolymer latex of methyl methacrylate and butyl acrylate in a ratio of 9:1 by weight having an average particle diameter of about 0.2 μm having a solid content of 25%

E-2: mixed latices of polystyrene and polyethyl acrylate in ratio of 1:1 by weight having an average particle diameter of about 0.15 μm having a solid content of 33%

E-3: a copolymer latex of styrene and butadiene in a ratio of 3:7 by weight having an average particle diameter of about 0.05 μm having a solid content of 38%

E-4: a copolymer latex of methyl methacrylate and 2-ethylhexyl acrylate in a ratio of 19:1 by weight having an average particle diameter of about 0.1 μm having a solid content of 20%

E-5: a latex of polymethyl acrylate having an average particle diameter of about 0.3 μm having a solid content of 36%

Turbidity of the waste water

A: The waste water was as clear as in the ordinary suspension polymerization of vinyl chloride without the addition of a modifier polymer latex.

B: The waste water was apparently turbid in white by containing the latex.

Particle size condition of polyvinyl chloride resin

A: The particle size distribution was as good as in ordinary polyvinyl chloride resins without the addition of a modifier polymer latex, 95% by weight of more passing through a 60 mesh screen.
B: The particle size distribution was somewhat worse 95% by weight or more passing through a 42 mesh screen.
C: The particle size distribution was apparently inferior, less than 95% by weight passing through a 42 mesh screen.

The relationship between the polymerization time in hours from the beginning of heating and the monomer conversion was as follows.

| Polymerization time, hours | 1 | 2 | 3 | 4 | 5 | 6 | 9 |
|---|---|---|---|---|---|---|---|
| Monomer conversion, % | 8 | 20 | 35 | 61 | 78 | 89 | 95 |

As is clear from the results in the table, the addition of the modifier polymer latex without the use of any inorganic fine powder resulted in unsatisfactory results in the turbidity of the waste water and/or the particle size condition of the resin product (Experiments No. 1 to No. 6). In particular, the introduction of the latex at an early stage (No. 1 and No. 2) is undesirable in both respects while clear waste water was obtained but the particle size condition was inferior by the introduction of the latex at a medium stage (No. 3 and No. 4) or vice versa by the introduction of the latex at a later stage (No. 5 and No. 6).

polymerization mixture is carried out at a too early stage.

In the next place, the workability of the resin products obtained in Experiments No. 5, No. 7 and No. 9 was compared with that of polymer blends of a commercial homopolymeric polyvinyl chloride resin (TK-1000, a product of Shin-Etsu Chemical Co., Japan) with one of the polymer powders prepared by drying the above mentioned latices E-1 and E-2 and, in one case, with bentonite. The workability of the resin blends was evaluated by the gelation time at 170° C. determined by subjecting the resin compositions each composed of 100 g of the resin or resin blend, 1.0 g of lead stearate, 2 g of tribasic lead sulfate and 0.5 g of barium stearate to a measurement with Plastograph (manufactured by Bradender C Co., West Germany) where the time to the maximum torque was recorded which was taken as the gelation time of the resin or resin blend. The results are shown in Table 2.

EXAMPLE 2

Into a stainless steel polymerization reactor of 20 liter capacity were introduced 8 kg of water, 3.7 kg of vinyl chloride monomer, 0.3 kg of vinyl acetate monomer, 6 g of a partially saponified polyvinyl acetate, 4 g of di-2-ethylhexylperoxy dicarbonate and 20 g of trichloroethylene to form a polymerization mixture which was heated up to 60° C. with agitation to effect the polymerization of the monomers. In the course of the polymerization reaction, an inorganic fine powder and a modifier polymer latex of the kinds indicated in Table 3 were introduced into the polymerization mixture in amounts and at the time also indicated in the table.

TABLE 1

| Exp. No. | Inorganic fine powder | | | Modifier polymer latex | | | Turbidity of waste water | Particle size condition of resin product |
|---|---|---|---|---|---|---|---|---|
| | kind | Time of introduction, hrs. | Amount added, g | Kind | Time of introduction, hrs. | Amount added, g, as solid | | |
| 1* | None | — | — | E-1 | 0 | 0.2 | B | —[1] |
| 2* | None | — | — | E-1 | 2 | 0.2 | B | C |
| 3* | None | — | — | E-1 | 3 | 0.2 | A | C |
| 4* | None | — | — | E-1 | 5 | 0.2 | A | C |
| 5* | None | — | — | E-1 | 9 | 0.2 | B | A |
| 6* | None | — | — | E-1 | —[2] | 0.2 | B | A |
| 7 | S-1 | 4.5 | 40 | E-1 | 5 | 0.2 | A | A |
| 8 | S-1 | 3 | 40 | E-1 | 4 | 0.2 | A | A |
| 9 | S-2 | 4 | 30 | E-2 | 5 | 0.2 | A | A |
| 10 | S-3 | 4 | 200 | E-3 | 5 | 0.2 | A | A |
| 11 | S-2 | 4 | 300 | E-1 | 5 | 1.5 | A | A |
| 12 | S-4 | 4.5 | 100 | E-3 | 5 | 0.2 | A | A |
| 13 | S-1 | 0 | 40 | E-1 | 5 | 0.2 | A | B |
| 14* | S-1 | 5 | 40 | E-1 | 4 | 0.2 | A | C |
| 15 | S-1 | 4.5 | 30 | E-4 | 5 | 0.2 | A | A |
| 16 | S-2 | 2.5 | 500 | E-5 | 3 | 1.2 | A | A |
| 17 | S-2 | 5 | 50 | E-4 | 5 | 0.2 | A | A |
| 18* | S-2 | 1 | 300 | E-1 | 2 | 1.5 | B | C |
| 19 | S-1 | 5.5 | 30 | E-1 | 6 | 0.2 | A | A |

*Comparative experiment
[1]Monomer conversion: 65%
[2]Monomer conversion: 75%

Even by the addition of an inorganic fine powder to the polymerization mixture, the time of its introduction was important as is evidenced by Experiment No. 14 in which the inorganic fine powder was introduced following the introduction of the modifier polymer latex to give an inferior particle size condition. Furthermore, even when the introduction of the latex was preceded by the introduction of the inorganic fine powder as in Experiment No. 18, the results will be unsatisfactory in both respects if the introduction of the latex into the

TABLE 2

| Resin or resin blend | Gelation time, minutes |
|---|---|
| The resin prepared in Exp. No. 5 | 7 |
| The resin prepared in Exp. No. 7 | 4 |
| The resin prepared in Exp. No. 9 | 5 |
| TK-1000 and dried powder of E-1, 94:6 by weight | 10 |
| TK-1000 and dried powder of E-2, 94:6 by weight | 12 |

TABLE 2-continued

| Resin or resin blend | Gelation time, minutes |
| --- | --- |
| TK-1000, dried powder of E-1 and bentonite, 94:6:1 by weight | 10 |

The polymerization reaction was terminated when the pressure inside the polymerization reactor had dropped to 3 kg/cm²G corresponding to a monomer conversion of about 93% by cooling the reaction to room temperature and the polymerizate slurry was dehydrated following the recovery of the unreacted monomers and the addition of 0.1 g of aluminum chloride and followed by drying to give the finished resin product.

The turbidity of the waste water from the dehydration and the particle size condition of the resin products were as shown in Table 3.

TABLE 3

| | Inorganic fine powder | | | Modifier polymer latex | | | Turbidity of waste water | Particle size condition of resin product |
| --- | --- | --- | --- | --- | --- | --- | --- | --- |
| Exp. No. | Kind | Time of introduction, hrs. | Amount added, g | Kind | Time of introduction, hrs. | Amount added, g, as solid | | |
| 20 | S-1 | 4[1] | 40 | E-1 | 4.5[2] | 0.2 | A | A |
| 21 | S-2 | 4[1] | 40 | E-4 | 4.5[2] | 0.3 | A | A |
| 22 | None | — | — | E-4 | 4.5[2] | 0.3 | A | C |

*Comparative experiment.
[1]Monomer conversion: 65%
[2]Monomer conversion: 75%

What is claimed is:

1. A process for the preparation of a vinyl chloride based resin modified with a polymer latex by suspension polymerization of vinyl chloride monomer or a mixture of monomers mainly composed of vinyl choride monomer in an aqueous medium in the presence of a water-soluble suspending agent and a polymerization initiator soluble in the monomer phase which comprises introducing the latex of the modifier polymer in an amount from about 0.1 to 50% by weight as solids based on the amount of monomers originally in the mixture into the polymerization mixture at a moment when the conversion of the monomer or monomers to polymer is in the range from 30% to 95%, introducing an inorganic fine powder having an average particle size not exceeding 50 μm into the polymerization mixture at the same time as or before the introduction of the latex of the modifier polymer and continuing the polymerization reaction to completion where the monomer conversion is larger by at least 2% than at the moment of the introduction of the latex of the modifier polymer.

2. The process as claimed in claim 1 wherein the inorganic fine powder is introduced into the polymerization mixture when the conversion of the monomer or the mixture of monomers to polymer is at least 10%.

3. The process as claimed in claim 1 wherein the amount of the inorganic fine powder is in the range of from 0.05 to 50% by weight based on the amount of the monomer or the mixture of monomers.

4. The process as claimed in claim 1 wherein the inorganic fine powder is selected from the group consisting of finely divided silicon dioxide, calcium carbonate, magnesium carbonate, bentonite, kaolin, sericite, aluminum oxide, titanium dioxide, clay, talc, calcium phosphate, calcium sulfate, diatomaceous earth and barium sulfate.

* * * * *